(12) United States Patent
Tongiani et al.

(10) Patent No.: US 8,025,784 B2
(45) Date of Patent: Sep. 27, 2011

(54) SYSTEM AND METHOD FOR CONTROLLING THE GENERATION OF A BIOCIDAL LIQUID

(75) Inventors: Bruno Tongiani, Phoenixville, PA (US); Claire Sampson, Doylestown, PA (US)

(73) Assignee: Puricore, Inc., Malvern, PA (US)

( * ) Notice: Subject to any disclaimer, the term of this patent is extended or adjusted under 35 U.S.C. 154(b) by 319 days.

(21) Appl. No.: 12/347,732

(22) Filed: Dec. 31, 2008

(65) Prior Publication Data
US 2009/0173635 A1    Jul. 9, 2009

Related U.S. Application Data

(60) Provisional application No. 61/006,286, filed on Jan. 4, 2008.

(51) Int. Cl.
*C25B 15/02* (2006.01)

(52) U.S. Cl. ........ 205/337; 205/335; 205/618; 205/620; 204/228.1; 204/228.6; 204/229.8; 204/230.2

(58) Field of Classification Search .............. 204/230.2, 204/228.1, 228.6, 229.8; 205/335, 337, 618, 205/620
See application file for complete search history.

(56) References Cited

U.S. PATENT DOCUMENTS

| | | | | |
|---|---|---|---|---|
| 5,624,535 | A * | 4/1997 | Tsuchikawa et al. | 204/228.2 |
| 5,948,220 | A * | 9/1999 | Kamitani et al. | 204/228.2 |
| 5,985,155 | A | 11/1999 | Maitland | |
| 6,632,347 | B1 | 10/2003 | Buckley et al. | |
| 2004/0055896 | A1* | 3/2004 | Anderson et al. | 205/701 |
| 2004/0060815 | A1* | 4/2004 | Buckley et al. | 204/230.2 |
| 2005/0013595 | A1* | 1/2005 | Israelson et al. | 392/449 |
| 2005/0197743 | A1* | 9/2005 | Rusta-Sallehy et al. | 700/300 |
| 2007/0017820 | A1* | 1/2007 | Anderson et al. | 205/701 |
| 2007/0163210 | A1 | 7/2007 | Glasbey et al. | |
| 2010/0285151 | A1* | 11/2010 | Goldan et al. | 424/662 |

FOREIGN PATENT DOCUMENTS

GB    2354478    3/2001

* cited by examiner

*Primary Examiner* — Bruce Bell
(74) *Attorney, Agent, or Firm* — Stradley Ronon Stevens & Young, LLP

(57) ABSTRACT

Methods and systems for generating biocidal solution having a predetermined level of available free chlorine and pH, including an electrolytic cell that generates the biocidal solution by an electrolytic reaction, the electrolytic cell including an input pipe for receiving an input brine solution, an anode chamber including an anode and a cathode chamber including a cathode separated by a separator, electrical connections for application of voltage to the anode and cathode; temperature sensing means for detecting a temperature of a solution of the electrolytic cell and outputting a signal indicative of the detected temperature; and process control means for adjusting the voltage applied to the electrolytic cell by the process control means thereby maintaining the level of available free chlorine and pH at the predetermined level in response to the signal output from the temperature sensing means.

16 Claims, 4 Drawing Sheets

SYSTEM AND METHOD FOR CONTROLLING THE GENERATION OF A BIOCIDAL LIQUID

CROSS-REFERENCE TO RELATED APPLICATIONS

This application claims the benefit of priority to U.S. Provisional Patent Application Ser. No. 61/006,286 filed on Jan. 4, 2008, the contents of which are incorporated in this application by reference.

BACKGROUND OF THE INVENTION

The present invention relates to an electrochemical generator and methods of using the same to generate a biocidal solution.

Biocidal solutions are often needed as a general disinfectant in various fields, such as in water decontamination, dental, medical and food preparation environments. For example, in hospitals, it is important to provide appropriate levels of sterility, particularly in operating rooms and other situations where invasive treatments are performed. Surgical instruments and other apparatus must be sterilized or disinfected, depending on their application, before use in order to reduce the risk of bacterial infection. One method of sterilization is the application of heat and pressure in an autoclave. However, this is not suitable for some medical apparatus, such as heat-sensitive endoscopes.

A typical method employed for reprocessing heat sensitive instruments involves the use of chemical biocides, such as glutaraldehyde. This can be unsatisfactory due to improper or incomplete disinfection. Furthermore, exposure to glutaraldehyde fumes can cause asthma and dermatitis in healthcare staff. Also, glutaraldehyde is believed to have relatively low sporicidal activity. Moreover, other disinfectants, such as chlorine dioxide and peracetic acid may suffer from similar handling problems as glutaraldehyde.

For some years, it has been known that electrochemical activation of brine or a saturated saline solution produces an electrochemically activated solution that is suitable for many applications, including general disinfection in medical and veterinary applications and the sterilization of heat-sensitive endoscopes, among other uses. There has been a recent interest in the use of an electrochemically activated solution as a disinfectant because of its rapid and highly biocidal activity against a wide range of bacteria, fungi, viruses and spores. Also, an electrochemically activated solution is an effective sterilizing cold non-toxic solution that is free from highly toxic chemicals, thereby presenting reduced handling risk.

Certain electrolytic cells are known to operate by a process described in commonly-assigned U.S. Pat. No. 6,632,347 to Buckley et al., the contents of which are incorporated herein in their entirety. Referring to FIG. 1, the formation of a biocidal liquid as described in this patent can be divided into three main processing stages, namely an input and pre-processing stage, a production stage, and a storage and dispensing stage.

In the first (inputs and pre-processing) stage, there is an input of potable water which, for the purpose of generating a saline solution for use in the electrolytic cell, can first be passed through a water softener zone where excessive magnesium and calcium ions can be removed. The softened water can then be passed into a process water buffer zone where it can be held until required for use in the production of brine. Potable water input can also be passed directly to the storage and dispensing stage for use in the preparation of bacteria-free rinse water (in which case the water may not need to be softened).

The first stage also includes a salt (halide salt or ionic salt, e.g. NaCl) input to a brine generation zone where a concentrated salt solution is made up from the salt and the softened water obtained via the process water buffer zone. A further input can be provided for additional agents, such as a corrosion inhibitor, used to condition output solution produced by the process. The conditioner can be passed to a conditioner storage zone where it can be held until required.

Turning to the second (production) stage, this can include a constant salinity subsystem in which a saline solution of substantially constant concentration is produced by dilution of the brine from the brine generation zone with softened water from the process water buffer zone to the desired concentration. The resulting saline solution can then be passed from the constant salinity subsystem to one or more electrolytic cells, each including cathode and anode chambers (not shown), and across which a substantially constant electric current can be applied. The applied electric current can be maintained constant via an energy control and monitoring zone.

Catholyte and anolyte are produced from the cathode and anode chambers respectively as a result of the electrochemical treatment of the saline solution in the cells. A portion of the catholyte can be re-circulated, directly or indirectly, into the anode chamber to control pH. Anolyte and any catholyte which is not re-circulated to the anode chamber can both be dealt with in the third (storage and dispensing) stage. In particular, catholyte which is not re-circulated can be directed to waste and anolyte, otherwise referred to as the output solution, can be passed to a buffer and quality subsystem. The output solution can be tested in the buffer and quality subsystem and, if it fails to meet the quality standards, it can also be directed to waste. If the output solution falls within specification, a quantity of conditioner, such as a corrosion inhibitor, can be added to it in the buffer subsystem and the output solution can then be permitted to pass either into an output solution storage zone from where it is subsequently dispensed for use or into a rinse water subsystem.

Output solution directed to the rinse water subsystem can be diluted with potable water from the potable water input and can then be passed to a rinse water storage zone from where it is subsequently dispensed.

Information on the various processing stages and the ability to interact with the process as described in U.S. Pat. No. 6,632,347 can be provided by means of a user interface and a service interface. The service interface also provides for remote access to the process, enabling an off-site engineer to obtain information on and make adjustments to the processing in each of the three stages.

Fluctuations in the temperature of the potable water causes a corresponding change in the temperature and conductivity of the brine solution that is formed from the potable water. The corresponding change in conductivity of the brine solution caused by the change in temperature affects the electrolytic process occurring in the electrochemical cells. Since conductivity of the brine solution is inversely related to resistance, a change in resistance effects current under Ohm's law (voltage (V) equals current (I) multiplied by resistance (R)). Aspects of the above relationships are described in commonly-assigned U.S. Patent Publication No. 2007/0017820 A1 of Anderson et al., the entire content of which is incorporated herein. Current in the electrolytic process should be maintained at the appropriate level to produce an output solution having the desired pH and available free chlorine (AFC)

levels. Therefore, there is a need for a control system to compensate for the fluctuations in temperature of the input water and input brine solution.

SUMMARY OF THE INVENTION

In an embodiment, the present invention provides a method of controlling the operation of an electrolytic cell that receives an input brine solution to produce an output solution having a predetermined level of available free chlorine (AFC) and a pH. The method comprises providing an electrolytic cell comprising an anode chamber including an anode and a cathode chamber including a cathode, wherein a voltage is applied to the anode and the cathode. The method further comprises detecting the temperature of a solution in the electrolytic cell by a temperature sensing means and providing a signal indicative of the detected temperature to a process control means. In response to the provided signal, the method further comprises adjusting the voltage applied to the electrolytic cell by the process control means to thereby maintain the predetermined level of AFC and pH of the output solution.

In another embodiment, a system for generating a biocidal solution having a predetermined level of AFC and pH is provided. The system comprises an electrolytic cell that generates the biocidal solution having the predetermined level of AFC and pH by an electrolytic reaction. The electrolytic cell comprises an input line for receiving an input brine solution; an anode chamber including an anode and a cathode chamber including a cathode; electrical connections for application of voltage to the anode and cathode; temperature sensing means for detecting a temperature of a solution of the electrolytic cell and outputting a signal indicative of the detected temperature; and process control means for adjusting the voltage applied to the electrolytic cell thereby maintaining the level of AFC and pH at the predetermined level in response to the signal output from the temperature sensing means.

In another embodiment, a method for controlling an electrolytic cell that generates a biocidal solution having a desired pH range and a desired AFC range from an input solution is provided. The method comprises detecting the temperature of the input solution passing through the electrolytic cell and in response to the detecting, adjusting current passing through the electrolytic cell to maintain the pH and AFC concentration within the desired ranges, respectively.

In yet another embodiment, a system for controlling an electrolytic cell that generates a biocidal solution having a desired pH range and a desired AFC range from an input solution is provided. The system comprises an input line for receiving an input brine solution, an electrolytic cell that includes a cathode chamber containing a cathode and an anode chamber containing an anode, electrical connections for applying a voltage to the anode and cathode, a temperature detector, and a processor. The temperature detector detects the temperature of the input solution and outputs a signal indicating the detected temperature. The processor controls a voltage source to apply a voltage to the electrolytic cell in response to the signal output from the temperature detector to control the AFC concentration and pH of the output solution.

BRIEF DESCRIPTION OF THE DRAWINGS

The exemplary embodiments will be discussed in detail with reference to the attached drawing figures, in which.

DETAILED DESCRIPTION OF THE INVENTION

In general, embodiments of the present invention provide methods and systems for producing a biocidal solution having a predetermined level of AFC and pH by controlling certain parameters of the electrolytic process in response to detected values of other parameters of the electrolytic process. Specifically, in certain embodiments, certain control process parameters (such as, for example, voltage and/or current) are adjusted automatically by a control processor based on output signals of sensors that detect certain processing conditions (such as, for example, temperature and/or pH).

In prior applications, a predetermined level of available free chlorine was produced by applying a substantially constant current across an electrochemical cell between a cathode and an anode while passing a substantially constant throughput of chloride ions through the cell. The level of available free chlorine, in general, is influenced by a number of factors such as the current between the cathode and anode of the electrochemical cell, the flow of chloride through the cell, and other factors.

Prior applications describe using NaCl, however, other salts can be used. For example, an ionic salt or halide or combination of different ionic salts or halides including a Group 1 metal and of a corresponding halogen of elemental chlorine, bromine iodine, astatine, and/or fluorine can be used to make the input brine solution. The brine solution can have various salt concentrations such as being a hypertonic solution (including 3% salt and/or 5% salt), or isotonic solution (0.9% salt), or a hypotonic solution (including <0.45% salt). The pH range of the output solution (HOX) can be approximately 4-8. In certain medical uses, the output solution can have a pH, for example, of approximately 4.5-6.75. As the purity of the solution increases, the pH can also change. For example, a solution having a medical>80% purity can have a pH of approximately 4.5-6.75, a solution having a medical>85% purity can have a pH of approximately 4.75-6.60, a solution having a medical>90% purity can have a pH of approximately 4.8-6.5, a solution having a medical>95% purity can have a pH of approximately 5.1-6.0. Of course, other purity percentages and pH values can be attained or provided. Besides generating hypohalous acid (HOX), embodiments of the disclosed generator can be used to produce hypofluorous acid, hypochlorous acid, hypobromous acid and/or hypoiodous acid.

Figure 1:
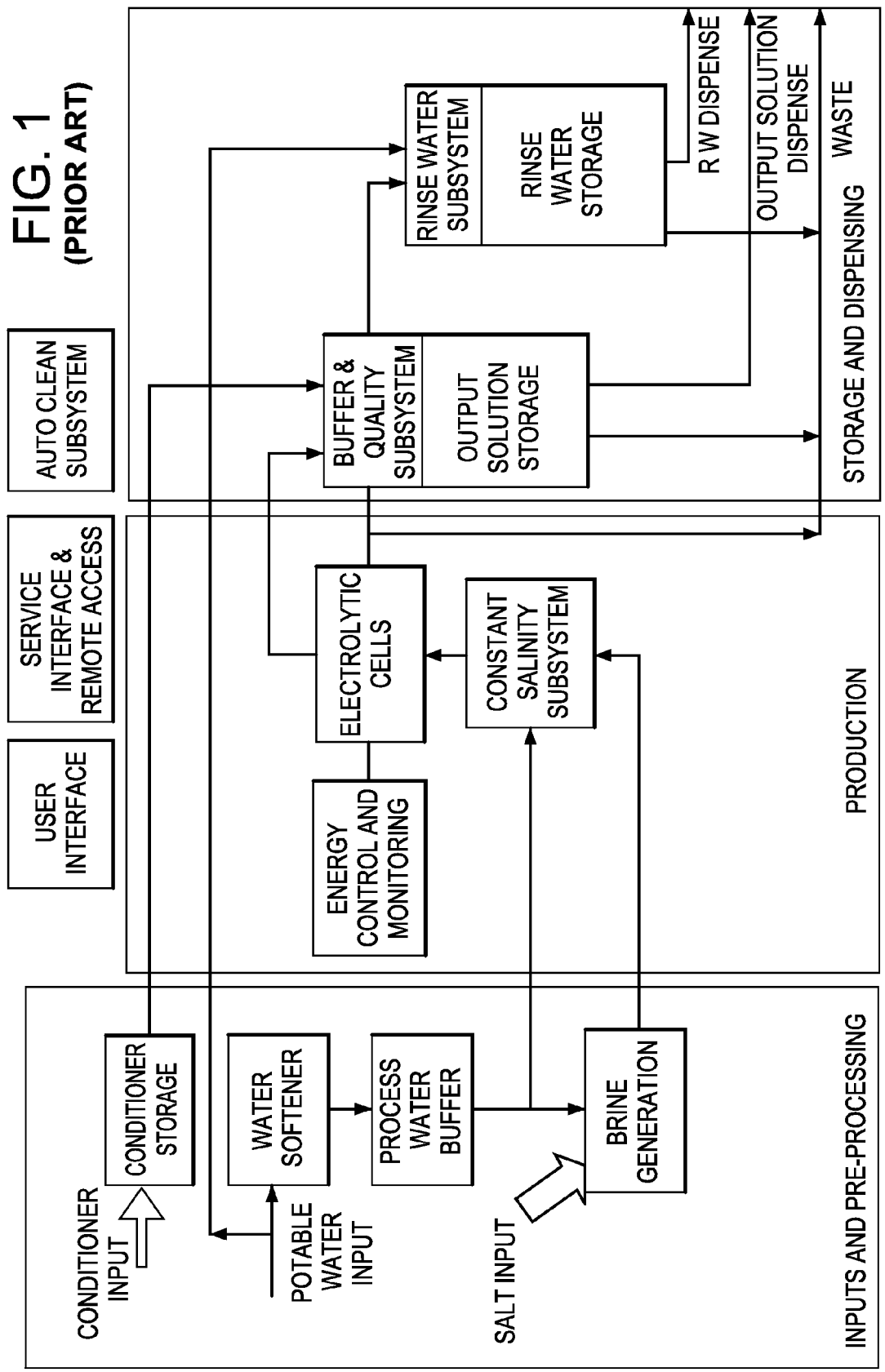
FIG. 1 illustrates a prior art process for producing a biocidal solution.
Figure 2:
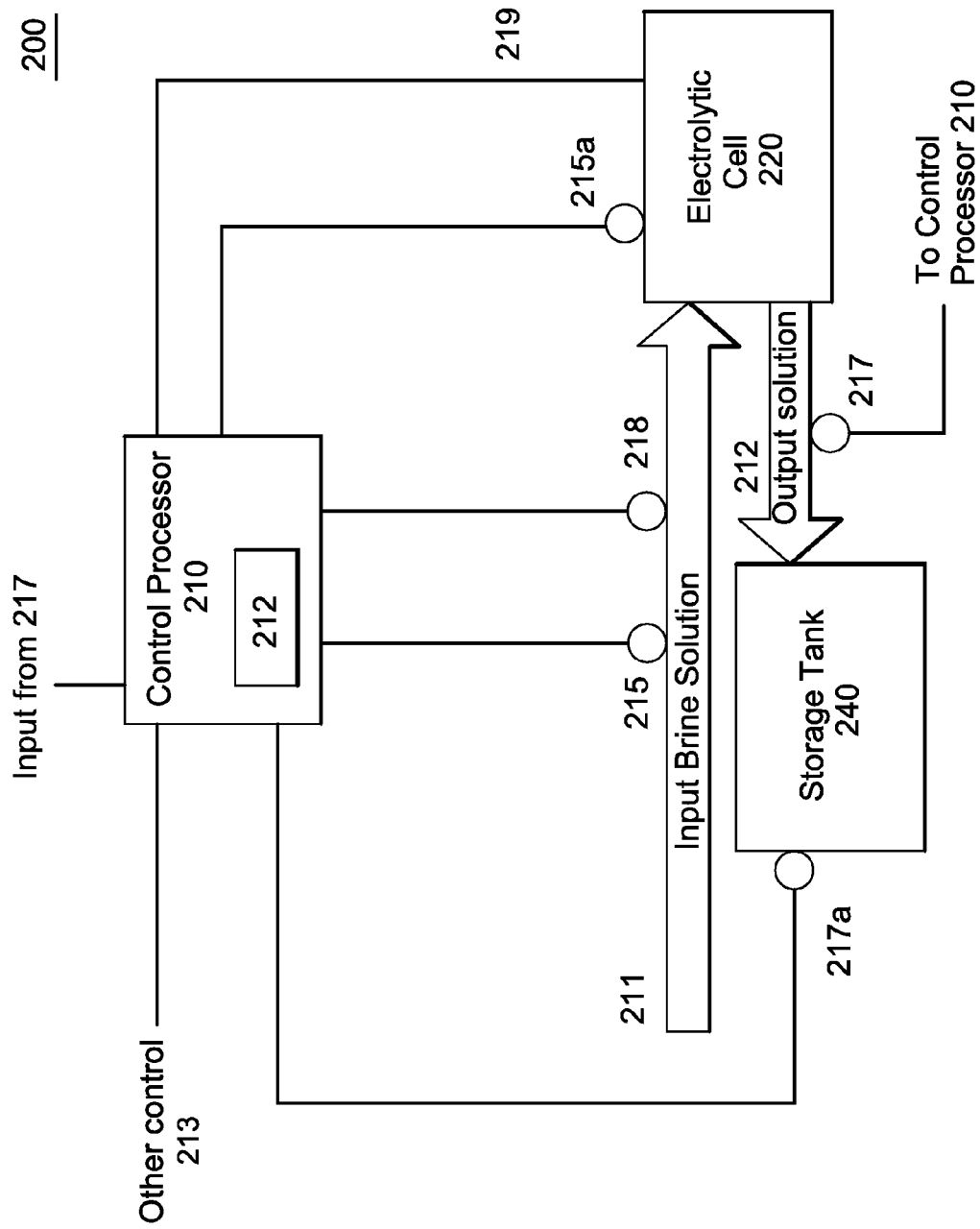
FIG. 2 illustrates an exemplary system for controlling a biocidal liquid generation device according to an embodiment of the present invention.

FIG. 2 illustrates a system 200 according to an embodiment of the present invention that comprises an input line 211, a control processor 210, a memory 212, an output power line 219, other control wiring 213, an electrolytic cell 220, an output line 212, a biocidal output solution storage tank 240, and a plurality of detectors 215, 215a, 217, 217a, and 218.

As stated above, the detectors can detect certain conditions of the electrolytic process (such as temperature and/or pH) and provide input signals to the control processor. In response to the input signals, the control processor controls other parameters of the process (such as voltage and/or current) to maintain the output solution at a predetermined pH and AFC concentration. In certain embodiments, detectors 215 and 215a are temperature detectors to detect the temperature of an input brine solution and a temperature of the electrolytic cell 220, respectively. In alternative embodiments, either of temperature detector 215 or 215a can be used. Temperature detector 215a can be a transducer-type temperature sensor, the operation of which is well known, that outputs signals in a range suitable for input to the control processor 210. An example of such a transducer-type temperature detector is a model LM35 manufactured by National Semiconductor. Temperature detector 215a can be surface mounted to an exterior surface of the electrolytic cell 220 in a location that provides suitable indications of the solution temperature without directly contacting the solution. For example, the temperature detector 215a can be located at the approximate center of an outside tube of a coaxial electrolytic cell. This configuration avoids the risk of leakage and other problems associated with tapping into the piping of the system.

Alternatively or in addition, temperature sensor 215 can be installed directly in the piping of input line 211 of the system to detect the temperature of the input water or input brine solution by direct contact with the solution. Temperature sensor 215 can be any one of well-known temperature sensors, and can be located in close proximity to the electrolytic cells 220.

The preferred temperature of the input brine solution is between about 15° and 35° Celsius (C). In certain embodiments, the temperature of the input brine solution is 25° C.

In certain embodiments, detectors 217 and 217a are pH detectors. The pH of the output solution can be monitored at either the output solution storage tank 240 or a point along output line 212 using pH detector 217a or 217, respectively.

A conductivity detector 218 can also be used to detect the conductivity of the input brine solution to provide a signal to control processor 200. Conductivity of the input brine solution is affected by temperature of the input water used in the formulation of the input brine solution. The input brine solution preferably has a conductivity ($\sigma_T$) between 0.05 to 12 milliSiemens per cm (mS/cm) or higher or lower.

The control process parameters, e.g., voltage provided over the anode and cathode, can be adjusted automatically by the control processor 210 based on the signals output from the above-described detectors to maintain the AFC and the pH of the output solution within a desired range, respectively. The control processor 210 can compare the detector output signals to a look-up table or other date structure in memory 212. A preferred range for pH of the biocidal output solution can be between about 4 to 8, more preferably between about 5 to 7, and even more preferably 6.8, depending upon the intended use of the output solution including all intermediate values therebetween. A preferred AFC concentration can be about 5 to 1010 parts per million, again, depending on the precise usage of the solution. For example, if the solution is used to disinfect dental lines and equipment, the AFC concentration can be about 180-260 and the pH between about 5.3 and 6.75. If the solution is used to disinfect a wound or other skin condition, the AFC concentration can be between about 100-300 and the pH between approximately 4.5 and 6.75, preferably having an approximate range of about 5.35 to 6.75. If the solution is used to clean medical equipment such as, for example, an endoscope, the AFC concentration can be about 220 to 650 and the pH between about 5.75 and 6.75. For uses such as crisping produce, an AFC of approximately 50 and pH of approximately 6.8 or higher are preferred. In produce misting applications, an AFC of approximately 4 and pH of approximately 6.8 or higher are preferred. When used in floral applications, an AFC of approximately 50 and a pH of approximately 6.8 are preferred. In an ice application, such as icing chicken, an AFC of approximately 10 and a pH of approximately 6.8 are preferred. An AFC of approximately 10 and a pH of approximately 6.8 or higher are preferred when treating seafood. In a hard surface disinfection application, an AFC of approximately 200 and a pH of approximately 7 are preferred. All of these values are inclusive of all intermediate values therebetween.

Figure 4:
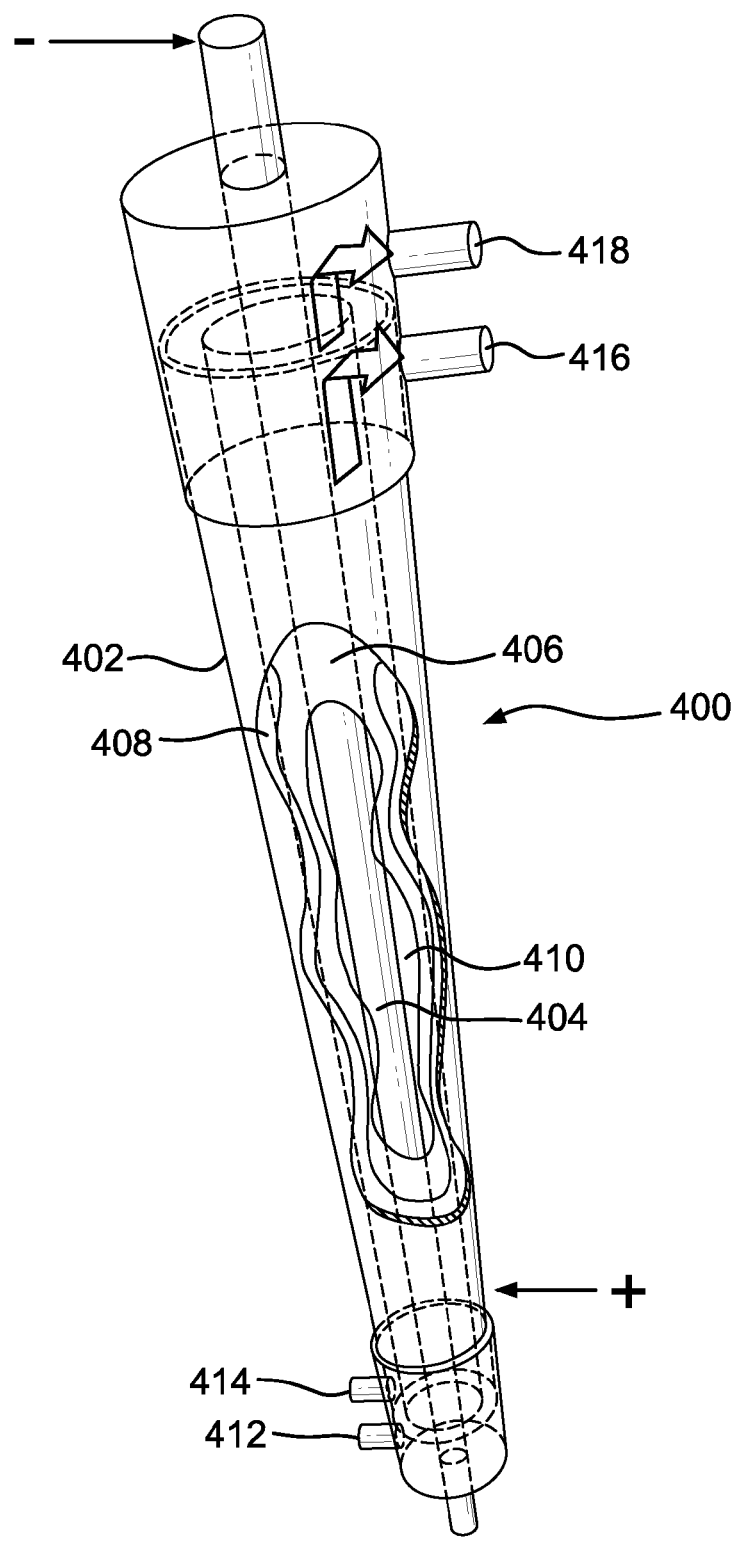
FIG. 4 is a schematic illustration of an exemplary electrochemical cell according to an embodiment of the present invention.

Electrolytic cell 220 can be a cell as described in U.S. Pat. No. 6,632,347 and as illustrated in FIG. 4. As shown in this embodiment, cell 400 comprises co-axial cylindrical and rod electrodes 402, 404, respectively, separated by a semi-permeable ceramic membrane 406 co-axially mounted between the electrodes thus splitting the space between the electrodes to form two chambers 408, 410. In this embodiment, the cylindrical electrode 402 acts as the anode and rod electrode 404 acts as the cathode, but a reverse arrangement could also be employed. The semi-permeable ceramic membrane 406 forms a separator creating the anode and cathode chambers 408 and 410. A non-limiting example of a ceramic membrane is described in the specification of patent application number GB 9914396.8, the subject matter of which is incorporated herein by reference in its entirety. Alternatively, a porous and permeable ceramic membrane can be used.

Cell 400 is provided with entry passages 412, 414 to permit the saline solution to enter the cell 400 and flow upwards through the anode and cathode chambers 408 and 410 and is discharged as anolyte and catholyte through exit passages 416, 418 respectively. The anolyte containing available free chlorine constitutes the output solution. Of course, the above-described arrangement of an electrochemical cell is only exemplary and other electrochemical cell arrangements could also be employed such as, for example, a parallel plate technology.

Referring back to FIG. 2, control processor 210 can be a general purpose processor programmed using software and having hardware to process received input signals and output control signals to maintain the desired chemical properties of the output solution produced by the electrochemical cell. Alternatively, the processor can be a specially designed processor using specific hardware and/or software to receive input signals and provide the necessary system control signals to maintain the desired chemical properties of the output solution. The control processor 210 can have the capability to communicate with external devices, such as a server or the like. Memory 212 can be non-volatile memory, an optical or magnetic storage medium, a flash memory, an external database, such as a server-based database, or the like.

Refinement of disclosed processes for creating the biocidal output solution have resulted in a reduced conductivity of the input brine solution while still maintaining the desired AFC and pH of the output solution.

In general, as the temperature of the input solution rises, the conductivity of the input solution rises, thereby lowering the electrical resistance of the solution. The lowering of the resistance causes an increase in current. In order to maintain a specified AFC range and pH range of the output solution, which are related to the current through the electrolytic cell, the voltage across the anode and cathode is lowered. As a result, the current through the electrolytic cell is also lowered. The relationship of the input brine solution temperature and control voltage and related current can be described in a non-linear curve. In a non-limiting example, the temperature of the input brine solution can preferably be approximately 25°±10° C., which results in the control voltage being set at approximately 9.0 volts (over four cells) plus or minus approximately 4 volts. The resulting output current is approximately 2 amperes, and generates an output solution (i.e., anolyte) having an approximate pH of 6.25 and an approximate AFC of 50. As the temperature lowers to, for example, approximately 15° C., the control voltage increases to approximately 12 volts or higher or lower and output current through the electrolytic cell 220 increases to approximately 3.5 amperes or higher or lower. Conversely, when the temperature rises to, for example, approximately 35°, the control voltage lowers to approximately 5 volts or higher or lower and output current decreases to approximately 1.25 amperes or higher or lower through the electrolytic cell 220. Of course, the applied control voltage can change depending upon the application. For example, the approximate 9.0 volts over four cells may be satisfactory for generating a low AFC output solution for a food application. While the applied voltage may be as high as 50 volts per four cells for generating an output solution suitable for treating wounds.

Figure 3:
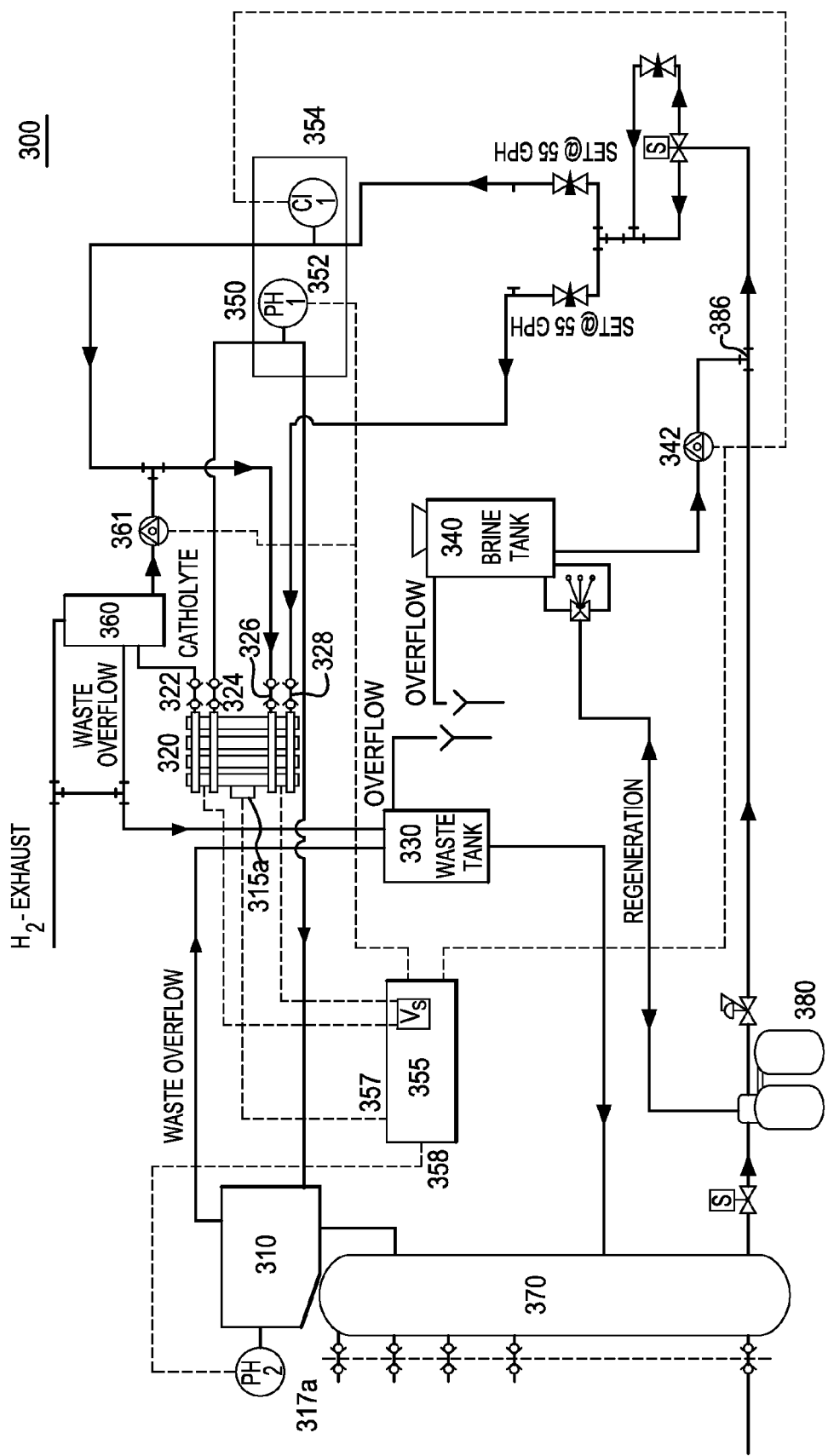
FIG. 3 illustrates an exemplary system in which exemplary embodiments according to the present application can be implemented.

FIG. 3 illustrates an exemplary non-limiting embodiment of a biocidal generation system according to an embodiment of the present invention. System 300 comprises an output solution storage tank 310, electrolytic cells 320 (which each contain an anode chamber containing an anode and a cathode chamber containing a cathode), a waste storage tank 330, a brine tank 340, a probe module 350, a controller 355, and, in certain embodiments, a catholyte holding tank 360 and an optional water softener 380. The water softener 380 can be of a type well known in this field of use and provides softened water to the system.

In addition, the exemplary system 300 may comprise a chemical routing system 370 for connecting various chemical-distribution hoses (e.g., input water connections, output solution distribution connection, waste drain connection and the like) or control cables to the system 300.

The output solution storage tank 310 further comprises a pH sensor 317a which monitors the pH of the output solution in the output solution storage tank 310. The output solution storage tank 310 connects to the chemical routing system 370.

The brine tank 340 receives input water from an input water coupling in chemical routing system 370. Output from the brine tank 340 is forwarded to a brine pump 342, which can be a positive displacement pump. Pump 342 pumps the brine solution from brine tank 340 to T-connection 386 to combine the brine solution with softened input water to create the brine solution for input into electrolytic cells 320. The combination of softened input water and brine solution can be input into the electrolytic cells 320 via input 328 and 326.

The outputs from the electrolytic cells 320 includes output 324 which is the output (anolyte) from the anode chamber of the electrolytic cells. In certain embodiments, output 322, which is catholyte produced from the cathode chamber of the electrolytic cells 320, is directed to a catholyte holding tank 360. This catholyte can be recirculated into electrochemical cell 320 via input line 326 in order to facilitate generation of biocidal output solution, i.e., anolyte, having the desired pH. In addition, temperature detector 315a is located at an exterior surface of the electrochemical cells 320. Temperature detector 315a can be a transducer-type sensor that outputs a signal indicating the detected temperature of the solution within the electrochemical cells 320. The output from the temperature detector 315a is sent to controller 355.

The catholyte chamber 360 holds the catholyte output from the electrolytic cells 320 via output line 322. The catholyte is removed by pump 361, which can be controlled by processor 200 (described above with respect to FIG. 2) based on outputs from the probe module 350 (described below). The pump 361 can pump a portion of the catholyte solution into the input flow of softened water, which is then input back into the electrolytic cells 320 via input 326.

Probe module 350 can comprise a pH detector 352, a conductivity detector 354, and/or a temperature detector. The pH detector 352 and conductivity detector 354 can be a well-known type such as those manufactured by SENTAK and Q.A. Supplies, respectively. The pH detector 352 can detect the fluid line for the pH of the anolyte solution output from electrolytic cells 320 or output 324. The conductivity detector 354 can detect the conductivity of the catholyte solution output from the catholyte chamber 360. The output signals from the pH detector 352 and conductivity detector 354 can be output to controller 355.

The controller 355 controls the operation of the system 300. The controller 355 can have an interface for connecting input control cables, output control cables, user interface devices (e.g., a computer with a display) and the like. Controller 355 receives the output signals from at least detectors 315a, 317a, 352 and 354. Of course, other system detectors can provide inputs to the controller 355 via the interface. The controller 355 comprises a voltage supply Vs, which applies voltage across the anode and cathode of the electrolytic cells 320. The amount of applied voltage from voltage source Vs corresponds to the amount of current through the electrolytic cells 320. The controller 355 can control the amount of voltage output from voltage source Vs based on inputs from the various detectors as described above with respect to FIG. 2. For example, temperature detector 315a can output a signal indicating that the temperature of the solution within the electrolytic cells 320 is approximately 35° C., the controller 355 receives the signal at input 357. Based on the signal values, the controller 355 can control the voltage source Vs to apply a voltage of approximately 0.48 volts, which results in an approximate output current of approximately 4.8 amperes through the electrolytic cells 320. Of course, depending upon the specified AFC range and pH range, the voltage and current values may change.

The controller 355 can also perform other control functions. For example, controller 355 can also receive signals at input 358 from pH detector 317a indicating the pH of the output solution in output solution storage tank 310. Based on the signal received from pH detector 317a, the controller 355 can determine if the output solution is within specifications, and take appropriate actions based on the determination. For example, draining the tank if the pH of the output solution is not within specifications. The controller 355 can also control pumps 342 and 361 based on the respective outputs from detectors 354 and 352.

If either of these outputs are outside the ranges for providing the desired pH and available free chlorine (AFC), then the voltage that is applied across the anode and the cathode in the electrolyte cell can either be reduced or increased with a respective increase or decrease in the current in the electrolyte cell. This compensates for changes in the temperature of the input water or the input brine solution created from the input water. If the temperature of input brine solution increases, its conductivity also increases and the control circuit will decrease the voltage which in turn results in a lower current applied to the cell.

Examples of applications of embodiments of the above disclosed device include integration of the device in showering or bathing systems in a care facility (hospital, out patient center, wound care clinic), a home, or other suitable locations. The disclosed device can be plumbed to a shower, bathing basin, or fitted with a hand held shower attachment, so a patient is treated with hypohalous acid (HOX). The disclosed device can be used in the treatment or rehabilitation of a patient, who may have MRSA, moderate to severe burns or wounds, or other skin conditions that require wound cleansing and/or debridement and/or antimicrobial treatment. The disclosed device can, in alternative embodiments, be integrated with or connected to pulsed lavage devices, ultrasound devices, hydrosurgery devices, hydrotherapy devices, and/or negative pressure devices, and used to fill intravenous (IV)/ surgical bags, bottles, bladders and other containers. In the event of treatment of a patient by soaking, irrigation, bathing or a similar treatment, a higher output solution temperature (e.g., 37-41 degrees C.) can be used.

The use of substantially pure water affects the shelf life (i.e., how long the output solution can be stored in output solution storage tanks or other storage containers) of the output solution. Filtering the water to remove organic load/ biological/organic matter from the water can extend the shelf life of the output solution. The pure water can be buffered before it is processed to produce hypohalous acid via electrolysis. Chilling the output solution to produce slurried ice provides exceptional coverage of an item or treatment area when a near-freezing or freezing output solution is needed for a particular application. The slurried hypohalous ice since it is in a thick liquid form has a molecular structure circular in nature that allows for coverage of an item by minimizing open spaces which can happen with ice cubes or ice flakes.

Slurried ice can be produced from a hypohalous acid output solution containing, for example, saline (i.e. halide salt) having a concentration of 0.45% -0.9% to form hypohalous acid slurried ice having rounded ice crystals within liquid. The slurry is formed by chilling the hypohalous acid output solution to temperatures of approximately minus (−) 5 to plus (+) 2 degrees C. Also, the salt (input) and output saline concentration can be defined as hypotonic e.g. 0.05-0.89% saline, hypertonic 3-9% saline or isotonic 0.9% saline.

The foregoing description and examples have been set forth merely to illustrate the invention and are not intended as being limiting. Each of the disclosed aspects and embodiments of the present invention may be considered individually or in combination with other aspects, embodiments, and variations of the invention. Further, while certain features of embodiments of the present invention may be shown in only certain figures, such features can be incorporated into other embodiments shown in other figures while remaining within the scope of the present invention. In addition, unless otherwise specified, none of the steps of the methods of the present invention are confined to any particular order of performance. Modifications of the disclosed embodiments incorporating the spirit and substance of the invention may occur to persons skilled in the art and such modifications are within the scope of the present invention. Furthermore, all references cited herein are incorporated by reference in their entirety.

The invention claimed is:

1. A method for controlling the operation of an electrolytic cell that receives an input brine solution to produce an output solution having a predetermined level of available free chlorine and pH, wherein the cell comprises an anode chamber including an anode and a cathode chamber including a cathode separated by a separator, wherein a voltage is applied to the anode and the cathode, the method comprising:
   detecting the temperature of a solution by a temperature detector;
   providing a signal indicative of the detected temperature to a control processor; and
   in response to the provided signal, adjusting the voltage applied to the electrolytic cell by the process control means thereby maintaining the predetermined level of available free chlorine and pH.

2. The method according to claim 1, wherein the temperature detector comprises a transducer mounted on a side, of the electrolytic cell, and detects the temperature of the solution in the electrolytic cell.

3. The method according to claim 1, wherein the temperature detector is a sensor that detects the temperature of the input brine solution.

4. The method according to claim 1, wherein the temperature detector is a sensor that detects the temperature of the input water.

5. The method according to claim 1, wherein the input brine solution comprises a salt.

6. The method according to claim 1 further comprising:
   detecting a conductivity of the input brine solution; and
   providing a signal indicative of the detected conductivity to the control processor.

7. The method of claim 1 wherein the adjusting the voltage comprises:
   detecting a first temperature and a second temperature at a later time;
   increasing the voltage if the second temperature is less than the first temperature; and
   decreasing the voltage if the second temperature is more than the first temperature.

8. A system for generating a biocidal solution having a predetermined level of available free chlorine and pH, the system comprising:
   an electrolytic cell that generates the biocidal solution having the predetermined level of available free chlorine and pH by an electrolytic reaction, the electrolytic cell comprising an input pipe for receiving an input brine solution, an anode chamber including an anode and a cathode chamber including a cathode separated by a separator, and electrical connections for application of voltage to the anode and cathode;
   temperature sensing means for detecting a temperature of a solution of the electrolytic cell and outputting a signal indicative of the detected temperature; and
   process control means for adjusting the voltage applied to the electrolytic cell thereby maintaining the level of available free chlorine and pH at the predetermined level in response to the signal output from the temperature sensing means.

9. A system according to claim 8, wherein the temperature sensing means comprises a transducer mounted on a side of the electrolytic cell, and detects the temperature of the solution in the electrolytic cell.

10. A system according to claim 8, wherein the temperature sensing means is a sensor that detects the temperature of the input brine solution.

11. A system according to claim 8, wherein the temperature sensing means is a sensor that detects the temperature of the input water.

12. A system according to claim 8 further comprising a conductivity detecting means for detecting a conductivity of the input brine solution and providing a signal indicative of the detected conductivity to the process control means.

13. The system of claim 8 wherein the process control means increases the voltage if the detected temperature decreases and decreases the voltage if the detected temperature increases.

14. A method for controlling an electrolytic cell that generates a biocidal solution having a desired pH range and a desired available free chlorine range from an input solution, comprising:
   detecting a temperature of the input solution passing through the electrolytic cell; and in response to the detecting, adjusting current passing through the electrolytic cell to maintain the pH and available free chlorine within the respective desired ranges.

15. A system for controlling an electrolytic cell that generates a biocidal solution having a desired pH range and a desired available free chlorine range from an input solution, comprising:

an electrolytic cell that receives the input solution and has electrodes for receiving an applied voltage, wherein current is passed from a first electrode to a second electrode through a solution in the electrolytic cell;

a temperature detector that detects a temperature of a solution and outputs a signal indicating the detected temperature; and a processor that controls a voltage source to apply an amount of voltage to the electrolytic cell in response to the signal output from the temperature detector.

16. The system of claim 15 wherein the process control means increases the voltage if the detected temperature decreases and decreases the voltage if the detected temperature increases.

* * * * *